United States Patent [19]
Shaw et al.

[11] 3,869,404
[45] Mar. 4, 1975

[54] NEODYMIUM DOPED $Na_2O \cdot P_2O_5$-$ZnCl_2$ GLASS EXHIBITING FLUORESCENCE AT 1.06 MICROMETERS

[75] Inventors: Robert R. Shaw, Sturbridge; Elias Snitzer, Wellesley, both of Mass.

[73] Assignee: American Optical Corporation, Southbridge, Mass.

[22] Filed: Jan. 11, 1973

[21] Appl. No.: 322,678

[52] U.S. Cl...... 252/301.6 P, 106/47 Q, 331/94.5 E
[51] Int. Cl......... C09k 1/06, C03c 3/28, C03c 3/16
[58] Field of Search...252/301.6 R, 301.6 P, 301.4 P, 252/301.4 R; 106/47 Q, 47 R

[56] References Cited
UNITED STATES PATENTS
3,580,859   5/1971   Buzhinsky et al. ............ 252/301.4 P

OTHER PUBLICATIONS
Schulz, I. — Naturwissenschaften, Vol. 44, (1957), p. 536, "Zinkehlorid als Glasbidner."

Ranson, H. — Inorganic Glass–Forming Systems — (1967), Academic Press, N.Y. — TP857R3, p. 164, pp. 247–8.

*Primary Examiner*—Winston A. Douglas
*Assistant Examiner*—Mark Bell
*Attorney, Agent, or Firm*—William C. Nealon

[57] ABSTRACT

A novel glass exhibits fluorescence from trivalent neodymium ions at a wavelength of approximately 1.06 micrometers. The glass consists essentially of 98 to 99 weight percent of a host glass and 1 to 2 weight percent of a compound which contributes trivalent neodymium ions to the glass. The host glass consists essentially of 30 to 50 mol percent of $Na_2O \cdot P_2O_5$ and 50 to 70 mol percent of $ZnCl_2$. The compound is selected from a group consisting of $Nd_2O_3$, $NdF_3$, and $NdCl_3$.

6 Claims, 1 Drawing Figure

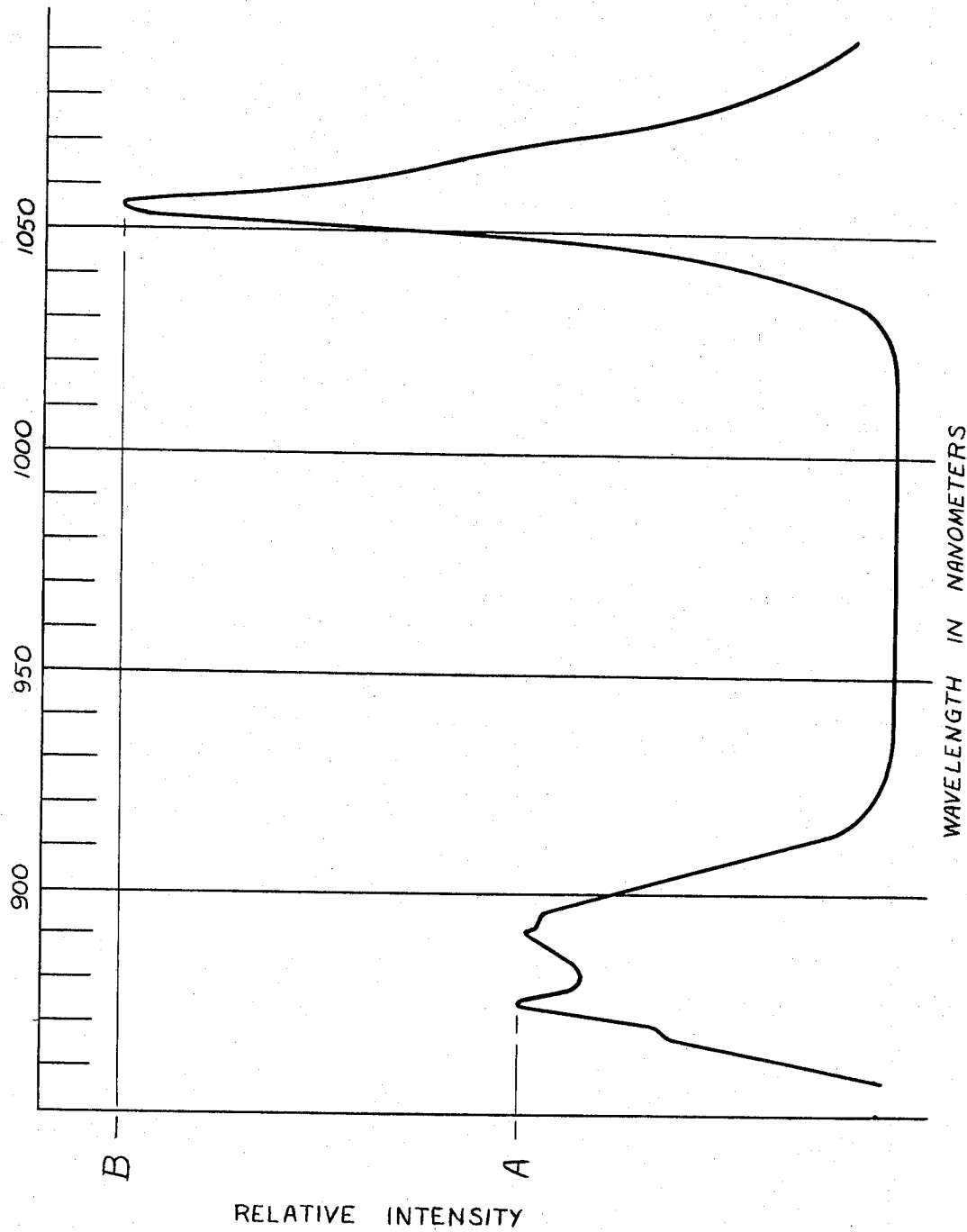

3,869,404

NEODYMIUM DOPED NA₂O·P₂O₅-ZNCL₂ GLASS EXHIBITING FLUORESCENCE AT 1.06 MICROMETERS

BACKGROUND OF THE INVENTION

This invention is related to novel glasses and is more particularly concerned with such glasses which exhibit fluorescence when doped with trivalent neodymium ions.

In recent years, the glass laser has become an extremely important class of lasers. The glasses are doped generally with trivalent rare earth ions. Predominant among these rare earth ions is the neodymium ion. Glass lasers doped with trivalent neodymium ions are capable of generating very high power outputs at relatively high efficiencies.

Glass has various characteristics which make it an ideal laser host material. It can be made in large pieces of diffraction-limited optical quality, e.g. with an index of refraction variation of less than 1 part per million across a 2.5 centimeter diameter. In addition, glass lasers have been made in a variety of shapes and sizes from fibers of a few microns diameter supporting only a single dielectric waveguide mode, to rods which are 2 meters long and 7.5 centimeters in diameter. Furthermore, pieces of glass with quite different optical properties can be fused to solve certain system design problems. For example, glass compositions can be varied in order to acquire an index of refraction varying throughout the range of from 1.5 to 2.0. Therefore, those skilled in the art are constantly searching for new glassy materials which can serve as viable hosts for the trivalent neodymium laser ions. This is done in order to enlarge the spectrum of physical, optical, and chemical properties in order to provide a glass material totally compatible with the designer's system requirements.

When searching for such viable host materials, it is characteristic to examine the fluorescence spectrum exhibited by the host material when doped with the trivalent neodymium ions. When one acquires such a host material, it is highly probable that an operable laser material can be formed of the new glass. The limitations on this generally revolve around the ability to manufacture the glass in sufficient quantity and of sufficient optical quality.

SUMMARY OF THE INVENTION

Accordingly, it is an object of the present invention to provide novel laser materials which exhibit fluorescence at the characteristic wavelength, 1.06 micrometers, generally associated with the trivalent neodymium ion.

Briefly, the invention in its broadest aspect comprises a glass consisting essentially of 98 to 99 weight percent of a host glass consisting essentially of 30 to 50 mol percent of $Na_2O \cdot P_2O_5$ and 50 to 70 mol percent of $ZnCl_2$ and 1 to 2 weight percent of a compound contributing trivalent neodymium ions where the compound is selected from a group consisting of $Nd_2O_3$, $NdF_3$, and $NdCl_3$.

Further objects, advantages, and features of the invention will be apparent from the following detailed description of the invention.

DESCRIPTION OF THE DRAWING

In the drawing, the sole FIGURE is a graphical representation of a typical fluorescence spectrum of a glass according to the present invention.

DETAILED DESCRIPTION OF THE PREFERRED EMBODIMENTS

In the drawing, a typical fluorescence spectrum curve is shown. The curve shows two peaks, at approximately 1.06 micrometers and at approximately 0.9 micrometers. The peak at 1.06 micrometers is generally the most important in glasses doped with neodymium. The peaks have relative intensity values A and B, associated with the peaks at 0.9 and 1.06 micrometers, respectively.

The fluorescence curves shown were measured in a Cary 14 spectrophotometer by placing the glass samples in a copper fixture which in turn were placed in the sample compartment of the Cary. The glass was irradiated at right angles with a Xenon arc lamp through a filter which blocked the transmission of wavelengths longer than approximately 800 nm. The fluorescent spectrum was recorded using the automatic slit control which adjusted the slit width so that the output of a coiled tungsten filament lamp with a filament temperature of approximately 2800°K produced a constant deflection on the recording chart for all wavelengths. Thus the recording chart must be corrected to obtain the true relative intensities by dividing the chart deflection by a factor proportional to the energy radiated by the tungsten lamp at the wavelengths of interest. We have estimated the correction factor to be approximately unity at the wavelengths of interest. This estimate was made by using the tungsten emissivities measured by J. C. DeVos (J. C. DeVos, Physics 20,690(1954) for a ribbon filament tungsten lamp operating at 2800°K in a calculation of the energy radiated by the coiled filament lamp at the two wavelengths of interest. The intensity ratios reported here were measured directly from the Cary charts using no correction factor.

Several examples of glasses according to the present invention are given in the following examples. Each of these glasses was formed in approximately a 50 gram melt. The glass is preferably formed in the following manner. The components were added to the batch as the final constituents and were added in the known stoichiometric amounts to yield a glass having a final composition as given in the following examples. The glass making materials must be of high purity and, in particular, must be free of contamination from iron or other elements which would cause light absorption at the primary fluorescence wavelength, 1.06 micrometers, if present in the glass. The finished glass, for example, should not contain more than 5 parts per million of iron as $Fe_2O_3$. The glass may be prepared by fusing the raw materials in a platinum crucible heated in a "Globar" electric furnace, an RF induction coil, or a gas flame. No special atmosphere was necessary in the furnace. The raw materials were mixed intimately and as completely as possible in a mixing device that does not introduce any contamination. The mixed batch was loaded into a platinum crucible which did not contaminate the melt with undesired impurities. The crucible was raised to a melting temperature of 1100°C. The batch was held at this temperature for approximately 15 minutes for the 50 gram samples. During this time, the melt was stirred with a platinum rod. The glass was then cast onto an iron plate at room temperature. It is to be understood that larger samples require a different procedure.

EXAMPLE 1

A glass which consists of about 99 weight percent of a host glass and about 1 weight percent of $NdCl_3$ has values for A and B of 0.40 and 0.74 respectively on the fluorescent emission spectrum. The composition, in mol percent, of the host glass is essentially

| | |
|---|---|
| $Na_2O \cdot P_2O_5$ | 30 |
| $ZnCl_2$ | 70 |

EXAMPLE 2

A glass which consists of about 98 weight percent of a host glass and about 2 weight percent of $Nd_2O_3$ has values for A and B of 0.51 and 1.04 respectively on the fluorescent emission spectrum. The composition, in mol percent, of the host glass is essentially

| | |
|---|---|
| $Na_2O \cdot P_2O_5$ | 40 |
| $ZnCl_2$ | 60 |

EXAMPLE 3

A glass which consists of about 98 weight percent of a host glass and about 2 weight percent of $NdCl_3$ has values for A and B of 0.36 and 0.66 respectively on the fluorescent emission spectrum. The composition, in mol percent, of the host glass is essentially

| | |
|---|---|
| $Na_2O \cdot P_2O_5$ | 40 |
| $ZnCl_2$ | 60 |

EXAMPLE 4

A glass which consists of about 98 weight percent of a host glass and about 2 weight percent of $NdCl_3$ has values for A and B of 0.28 and 0.60 respectively on the fluorescent emission spectrum. The composition, in mol percent, of the host glass is essentially

| | |
|---|---|
| $Na_2O \cdot P_2O_5$ | 50 |
| $ZnCl_2$ | 50 |

EXAMPLE 5

A glass which consists of about 99 weight percent of a host glass and about 1 weight percent of $NdF_3$ has values for A and B of 0.42 and 0.87 respectively on the fluorescent emission spectrum. The composition, in mol percent, of the host glass is essentially

| | |
|---|---|
| $Na_2O \cdot P_2O_5$ | 40 |
| $ZnCl_2$ | 60 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A glass which exhibits fluorescence at a wavelength of 1.06 um consisting essentially of 98 to 99 weight percent of a host glass consisting essentially of 30 to 50 mol percent of $Na_2O \cdot P_2O_5$ and 50 to 70 mol percent of $ZnCl_2$ and 1 to 2 weight percent of a compound contributing trivalent neodymium ions where the compound is selected from a group consisting of $Nd_2O_3$, $NdF_3$ and $NdCl_3$.

2. A glass according to claim 1, wherein the host glass has essentially the following composition as given in mol percent

| | |
|---|---|
| $Na_2O \cdot P_2O_5$ | 30 |
| $ZnCl_2$ | 70 | and wherein the compound contributing trivalent neodymium ions is $NdCl_3$ and is present in an amount of about 1 weight percent.

3. A glass according to claim 1, wherein the host glass has essentially the following composition as given in mol percent

| | |
|---|---|
| $Na_2O \cdot P_2O_5$ | 40 |
| $ZnCl_2$ | 60 | and wherein the compound contributing trivalent neodymium ions is $Nd_2O_3$ and is present in an amount of about 2 weight percent.

4. A glass according to claim 1, wherein the host glass has essentially the following composition as given in mol percent

| | |
|---|---|
| $Na_2O \cdot P_2O_5$ | 40 |
| $ZnCl_2$ | 60 | and wherein the compound trivalent neodymium ions is $NdCl_3$ and is present in an amount of about 2 weight percent.

5. A glass according to claim 1, wherein the host glass has essentially the following composition as given in mol percent

| | |
|---|---|
| $Na_2O \cdot P_2O_5$ | 50 |
| $ZnCl_2$ | 50 | and wherein the compound contributing trivalent neodymium ions is $NdCl_3$ and is present in an amount of about 2 weight percent.

6. A glass according to claim 1, wherein the host glass has essentially the following composition as given in mol percent

| | |
|---|---|
| $Na_2O \cdot P_2O_5$ | 40 |
| $ZnCl_2$ | 60 | and wherein the compound contributing trivalent neodymium ions is $NdF_3$ and is present in an amount of about 1 weight percent.

* * * * *